US012749106B2

(12) United States Patent
Zhang

(10) Patent No.: US 12,749,106 B2
(45) Date of Patent: Sep. 29, 2026

(54) METHOD FOR RECOMMENDING AND PURCHASING VIRTUAL ITEM OF GAME, AND ELECTRONIC DEVICE

(71) Applicant: NETEASE (HANGZHOU) NETWORK CO., LTD., Hangzhou (CN)

(72) Inventor: Cunjun Zhang, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 539 days.

(21) Appl. No.: 18/043,062

(22) PCT Filed: Feb. 22, 2021

(86) PCT No.: PCT/CN2021/077305

§ 371 (c)(1),
(2) Date: Feb. 27, 2023

(87) PCT Pub. No.: WO2022/041663

PCT Pub. Date: Mar. 3, 2022

(65) Prior Publication Data

US 2024/0029137 A1 Jan. 25, 2024

(30) Foreign Application Priority Data

Aug. 31, 2020 (CN) ......................... 202010899589.9

(51) Int. Cl.
*G06Q 30/00* (2023.01)
*G06Q 30/0601* (2023.01)
(Continued)

(52) U.S. Cl.
CPC ..... *G06Q 30/0631* (2013.01); *G06Q 30/0621* (2013.01); *G06F 3/04842* (2013.01); *G06F 3/0488* (2013.01)

(58) Field of Classification Search
None
See application file for complete search history.

(56) References Cited

U.S. PATENT DOCUMENTS 11,741,528 B1 * 8/2023 Gjertson ............ G06Q 30/0631 705/26.7
2013/0244784 A1 9/2013 Assa
(Continued)

FOREIGN PATENT DOCUMENTS

CN 109670903 A 4/2019
CN 110602532 A 12/2019
(Continued)

OTHER PUBLICATIONS

Recommender System for Items in Dota 2; Wenli Looi et al.; Dec. 1, 2019.*

(Continued)

*Primary Examiner* — Mila Airapetian
(74) *Attorney, Agent, or Firm* — Qinghong Xu

(57) ABSTRACT

A method for recommending a virtual item of a game, includes: displaying at least one virtual item through the graphical user interface; in response to a first operation against a target virtual item in the at least one virtual item, displaying multiple object identifiers on the graphical user interface, second virtual objects corresponding to the object identifiers and the first virtual object belong to a same camp; in response to a selection operation against the object identifiers, determining a target object identifier from the multiple object identifiers; and in response to a sending operation, sending, to the second virtual object corresponding to the target object identifier, a push message carrying an identifier of the target virtual item, causing a second terminal
(Continued)

device, used for controlling the second virtual object corresponding to the target object identifier, to display the target virtual item.

16 Claims, 4 Drawing Sheets

(51) Int. Cl.
*G06F 3/04842* (2022.01)
*G06F 3/0488* (2022.01)

(56) References Cited

U.S. PATENT DOCUMENTS

2013/0268897 A1* 10/2013 Li ........................ G06F 3/0482
715/841
2020/0155948 A1* 5/2020 Eatedali .................. A63F 13/85

FOREIGN PATENT DOCUMENTS

CN 111352568 A 6/2020
CN 111589103 A 8/2020
CN 111905364 A 11/2020

OTHER PUBLICATIONS

International Search Report dated May 31, 2021 of International Application No. PCT/CN2021/077305.

* cited by examiner

METHOD FOR RECOMMENDING AND PURCHASING VIRTUAL ITEM OF GAME, AND ELECTRONIC DEVICE

CROSS-REFERENCE

The present application is the U.S. national phase application of PCT Application No. PCT/CN2021/077305, filed on Feb. 22, 2021, which claims the priority to the Chinese Patent Application No. 202010899589.9, entitled "METHOD FOR RECOMMENDING AND PURCHASING VIRTUAL ITEM OF GAME, AND ELECTRONIC DEVICE", filed on Aug. 31, 2020, and the entire contents of which are hereby incorporated by reference in their entirety.

TECHNICAL FIELD

The present disclosure relates to the technical field of games, and in particular, to a method for recommending a virtual item of a game, and a method for purchasing a virtual item of a game, and an electronic device.

BACKGROUND

In MOBA (Multiplayer Online Battle Arena) type of games, in order to fight better with enemy, there is often a need to adjust one's own outfits according to the enemy's lineup and outfits. However, for some non-experienced players, they may not be able to adjust their outfits in time due to a large number of equipment and lack of familiarity with the game, so they need to be reminded by more skilled teammates.

According to the applicant's understanding, it is only possible to suggest outfits to the teammates through in-game text input. This has disadvantages: 1. For players who send out the suggestion, text input is required, which is a cumbersome operation and will waste more time in fast-paced battles; 2. For players who receive the suggestion, it may be difficult to identify because their teammates use equipment abbreviations or aliases, and it is difficult to find the equipment in the numerous equipment in the store interface for a moment.

SUMMARY

One embodiment of the present disclosure discloses a method for recommending a virtual item of a game, wherein a graphical user interface is provided through a first terminal device, the first terminal device is configured to control a first virtual object, and the method includes:

- displaying at least one virtual item through the graphical user interface;
- in response to a first operation on a target virtual item in the at least one virtual item, displaying multiple object identifiers on the graphical user interface, wherein second virtual objects corresponding to the object identifiers and the first virtual object belong to a same camp;
- in response to a selection operation on the object identifiers, determining a target object identifier from the multiple object identifiers;
- in response to a sending operation, sending, to the second virtual object corresponding to the target object identifier, a push message carrying an identifier of the target virtual item, causing a second terminal device, used for controlling the second virtual object corresponding to the target object identifier, to display the target virtual item on a graphical user interface of the second terminal device.

One embodiment of the present disclosure discloses a method for purchasing a virtual item, wherein a graphical user interface is provided through a second terminal device, the second terminal device is configured to control a second virtual object, and the method includes:

- when receiving a push message carrying an identifier of a target virtual item, displaying the target virtual item corresponding to the identifier of the target virtual item in the push message through the graphical user interface of the second terminal device, wherein the push message is sent by a first terminal device to the second virtual object in response to a user operation, the first terminal device is a device used for controlling a first virtual object, and the first virtual object and the second virtual object belong to a same camp;
- in response to a touch operation on the target virtual item, controlling the second virtual object to purchase the target virtual item or controlling the second virtual object to preorder the target virtual item.

One embodiment of the present disclosure discloses a method for recommending a virtual item of a game, the game includes a first virtual object controlled by a first terminal device and at least one second virtual object controlled by at least one second terminal device, wherein the first virtual object and the second virtual object belong to a same camp, and the method includes:

- displaying at least one virtual item through a graphical user interface of the first terminal device;
- in response to a first operation on a target virtual item in the at least one virtual item, displaying at least one object identifier corresponding to the at least one second virtual object on the graphical user interface of the first terminal device;
- in response to a selection operation on the object identifiers, determining a target object identifier from the at least one object identifier;
- in response to a sending operation, sending, to the second virtual object corresponding to the target object identifier, a push message carrying an identifier of the target virtual item;
- displaying the target virtual item corresponding to the identifier of the target virtual item in the push message through a graphical user interface of the second terminal device;
- in response to a touch operation on the target virtual item, controlling the second virtual object to purchase the target virtual item or controlling the second virtual object to preorder the target virtual item.

One embodiment of the present disclosure discloses an electronic device, and the electronic device includes:

- a processor, a memory and a bus, the memory storing machine-readable instructions executable by the processor; and when the electronic device is running, the processor communicates with the memory through the bus, the machine-readable instructions are executed by the processor to implement the method according to any one of embodiments of the present disclosure.

One embodiment of the present disclosure discloses a storage medium, storing a computer program, wherein the computer program, when executed by a processor in working, implements the method according to any one of embodiments of the present disclosure.

It should be understood that the above general description and the later detailed description are only illustrative and explanatory, and cannot limit the present disclosure.

BRIEF DESCRIPTION OF THE DRAWINGS

The drawings herein are incorporated into and form part of the specification, illustrating embodiments consistent with the present disclosure, and are used in conjunction with the specification to explain the principles of the present disclosure. Obviously, the drawings in the following description are only some embodiments of the present disclosure. For those of ordinary skill in the art, other drawings can be acquired based on these drawings without creative work.

DETAILED DESCRIPTION

Figure 1:
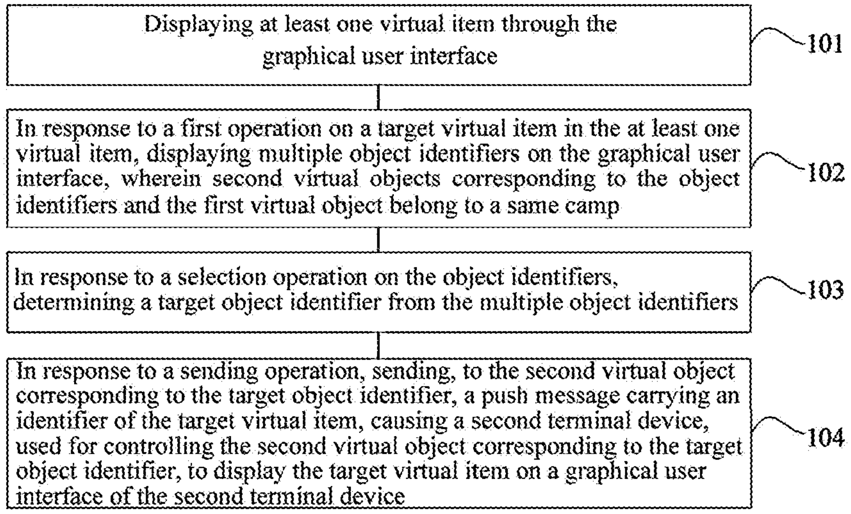
FIG. 1 is a flowchart of steps of a method for recommending a virtual item of a game of an embodiment of the present disclosure.

Example embodiments will now be described more comprehensively with reference to the accompanying drawings. However, the example embodiments can be implemented in a variety of forms and should not be understood as limited to the examples described herein; on the contrary, providing these embodiments will allow the present disclosure to be more comprehensive and complete, and will comprehensively convey the concept of the example embodiments to those skilled in the art.

In addition, the described features, structures or characteristics may be combined in one or more embodiments in any suitable manner. In the following description, many specific details are provided to give a full understanding of the embodiments of the present disclosure. However, those skilled in the art will realize that the technical solution of the present disclosure may be practiced without one or more specific details, or by using other methods, components, devices, steps, etc. In other instances, well-known methods, devices, implementations or operations are not shown or described in detail to avoid obscuring various aspects of the present disclosure.

The block diagrams shown in the accompanying drawings are only functional entities and do not necessarily correspond to physically independent entities. That is, these functional entities may be implemented in the form of software, or in one or more hardware modules or integrated circuits, or in different networks and/or processor devices and/or microcontroller devices.

The flow charts shown in the accompanying drawings are only exemplary illustrations, and are not necessarily include all contents and operations/steps, nor must be executed in the described order. For example, some operations/steps may also be decomposed, while some operations/steps may be combined or partially combined, so the order of actual execution may change according to the actual situation.

In order to make the above objects, features and advantages of the present disclosure more clearly understood, the present disclosure will be described in further detail below with reference to the drawings and specific embodiments.

In one embodiment of the present disclosure, the method for recommending a virtual item of a game and the method for purchasing a virtual item of a game may run on a terminal device or a server. Herein, the terminal device nay be a local terminal device. When the method for recommending a virtual item of a game and the method for purchasing a virtual item of a game are running on the server, the method for recommending a virtual item of a game and the method for purchasing a virtual item of a game can be implemented and executed based on a cloud interaction system. Herein, the cloud interaction system includes a server and a client device.

In an optional implementation, various cloud applications, e.g., cloud games, may run under the cloud interaction system. Take cloud gaming as an example, cloud gaming refers to a game mode based on cloud computing. In the operation mode of the cloud gaming, the operation body of the game program and the presentation body of the game screen are separated, the storage and operation of the method for recommending a virtual item of a game and the method for purchasing a virtual item of a game are completed on the cloud gaming server, and the client device is configured to receive and send data and present the game screen. For example, the client device may be a display device with data transmission function near the user side, such as a first terminal device, TV, computer, PDA, etc.; but the terminal device for running the method for recommending a virtual item of a game and the method for purchasing a virtual item of a game is a cloud gaming server in the cloud. When playing a game, the player operates the client device to send operation instructions to the cloud gaming server, and the cloud gaming server runs the game according to the operation instructions, encodes and compresses the game screen and other data, and then returns it to the client device through network. Finally, the game screen is decoded and output through the client device.

In an optional implementation, the terminal device may be a local terminal device. In the case of a game, for example, the local terminal device stores a game program and is used to present a game screen. The local terminal device is used to interact with the player through a graphical user interface, i.e., the game program is conventionally downloaded and installed and run via an electronic device. The local terminal device may provide the graphical user interface to the player in a variety of ways, for example, the graphical user interface may be rendered and displayed on the display screen of the terminal or, alternatively, provided to the player by holographic projection. For example, the local terminal device may include a display screen and a processor, the display screen is configured to display a graphical user interface, the graphical user interface includes a game screen, and the processor is configured to run the game, generate the graphical user interface, and control the displaying of the graphical user interface on the display screen.

Referring to FIG. 1, a flowchart illustrating the steps of a method for recommending a virtual item of a game of an embodiment of the present disclosure is shown. Herein, a graphical user interface is provided through a first terminal device, the first terminal device is configured to control a first virtual object, and the method for recommending a virtual item of a game may specifically include the following steps 101 to 104.

In the step 101, at least one virtual item is displayed through the graphical user interface.

It should be noted that the first terminal device may be a local terminal device mentioned above, or may be a client device in a cloud interactive system mentioned above. The operating system of the first terminal device may include Android, IOS, Windows Phone, Windows, etc., and can typically support the operation of various game applications.

By running a game application on the first terminal device, a graphical user interface is obtained on a display screen of the first terminal device by rendering, and content displayed through the graphical user interface at least includes a partial or full game scene. The specific shape of the game scene can be square or other shapes (for example, circle, etc.). Specifically, content in the game scene may include a first virtual object, the first virtual object may be a game virtual character manipulated/controlled by a player through the first terminal device, and content in the game scene may also include second virtual objects, the second virtual objects and the first virtual object belong to a same camp, and the second virtual objects are game virtual characters manipulated/controlled by friendly players in the game. In addition, content in the game scene may also include a game virtual character manipulated/controlled by an enemy player in the game.

In the embodiments of the present disclosure, at least one virtual item is displayed through the graphical user interface. The virtual item may be equipment, shoes and other items in the game, for enhancing the attributes of the first virtual object manipulated/controlled by the player, e.g., after the player purchases the shoes, the movement speed of the player can be enhanced.

In the step 102, in response to a first operation on a target virtual item in the at least one virtual item, multiple object identifiers are displayed on the graphical user interface, herein second virtual objects corresponding to the object identifiers and the first virtual object belong to a same camp.

In order to avoid the need to recommend a virtual item to the teammate by manual input, in the embodiments of the present disclosure, the user operation is combined with the operation of recommending equipment, a push message corresponding to the virtual item can be generated directly in response to the user operation, and the push message will be pushed to the teammate to facilitate the purchase of the virtual item by the teammate.

Specifically, when a player needs to recommend a virtual item to a teammate, a first operation can be performed on the target virtual item in at least one virtual item, and the first operation may be an operation for triggering a quick recommendation of a virtual item, including a long press operation, a click operation or a double-click operation, etc., which is not limited by the embodiments of the present disclosure. It should be noted that, in the case of the long press operation, a critical time length tO may be set, a hold time t on the target virtual item in the at least one virtual item is detected, and a long press operation is considered to be detected when t to.

The first terminal device may have a data collection module and a data reporting module, the first operation of the player acting on the target virtual item in the at least one virtual item is collected in real time through the data collection module, and then is reported to the game application through the data reporting module, and the reported first operation may carry a trigger position.

After the game application receives the first operation acting on the target virtual item in the at least one virtual item, it may respond to the first operation by determining the target virtual item from the at least one virtual item, and the target virtual item is the virtual item to be recommended to the teammate. Specifically, the game application may extract the trigger position in the first operation, and determine the target virtual item from the plurality of virtual items based on the trigger position.

After determining the target virtual item, the multiple object identifiers may further be displayed on the graphical user interface, and the second virtual objects corresponding to the object identifiers and the first virtual object belong to a same camp. Herein, the object identifier is a logo used for representing a virtual object in the game, for example, an object identifier may be an avatar of a virtual object.

Specifically, a plurality of second virtual objects (i.e., virtual objects controlled by the player's teammates) in the game belonging to the same camp as the first virtual character manipulated/controlled by the player may be determined, and the multiple object identifiers corresponding to these second virtual objects may be displayed on the graphical user interface. As an example, when there are four virtual objects in the game belonging to the same camp as the virtual character manipulated/controlled by the player, four object identifiers are displayed on the graphical user interface.

In the step 103, in response to a selection operation on the object identifiers, a target object identifier is determined from the multiple object identifiers.

The player may perform a selection operation on the object identifiers to select the object identifier corresponding to the virtual object requiring the recommended virtual item, and the first terminal device may detect the selection operation performed by the player against the object identifiers in real time and report the selection operation to the game application. Herein, the selection operation refers to the operation for selecting the object identifier, and the selection operation may be at least one of the following operations: a click operation and a slide operation. In the specific implementation, the player may select multiple object identifiers as the target object identifier by multiple click operations, and the click operation reported by the first terminal device may include a trigger position. The slide operation may be a continuous operation performed by the player through an operation medium (such as a stylus, user's finger, etc.). The slide operation may have a corresponding touch point. The reported slide operation may include each trigger position of the touch point at different moments. In addition, the selection operation may also be set as other user operations according to actual needs, such as long press operation, which is not limited by the embodiments of the present disclosure.

After receiving the selection operation on the object identifiers, the game application may respond to the selection operation to determine the target object identifier from the multiple object identifiers. Specifically, a trigger position in the selection operation may be extracted, and the target object identifier may be determined from the multiple object identifiers based on the trigger position.

In the step 104, in response to a sending operation, a push message carrying an identifier of the target virtual item is sent to the second virtual object corresponding to the target object identifier, causing a second terminal device, used for controlling the second virtual object corresponding to the target object identifier, to display the target virtual item on a graphical user interface of the second terminal device.

The push message may be a message for recommending a virtual item to a player, the push message may carry an identifier of the target virtual item. Herein, the identifier of the target virtual item is a unique identification code of the target virtual item, and the virtual item may have a one-to-one corresponding identification code.

After determining the target object identifier, the player may further perform the sending operation on the graphical user interface, the sending operation may be an operation for triggering the sending of the push message. Specifically, the sending operation may be a click operation on a confirmation control on the graphical user interface. The sending operation may also be the end of a slide operation, the first terminal device may detect the slide operation acting on the graphical user interface in real time, and the end of the slide operation is equivalently detected when the operation medium performing the slide operation is detected as leaving the graphical user interface.

After receiving the sending operation, the game application may respond to the sending operation by generating a push message carrying an identifier of the target virtual item and sending the push message to the second virtual object corresponding to the target object identifier to cause a second terminal device, used for controlling the second virtual object corresponding to the target object identifier, to display the target virtual item on a graphical user interface of the second terminal device. Thereby, a player controlling the second virtual object may quickly purchase the target virtual item according to the push message after receiving the push message. Specifically, the game application may, after receiving the push message, trigger the displaying of the target virtual item on the graphical user interface, thereby the player may purchase the target virtual item or preorder the target virtual item by performing a touch operation on the target virtual item.

Through the first operation to trigger the quick selection of a virtual item that needs to be recommended, then through the selection operation to flexibly select the virtual objects that need to be recommended, and by sending the push message for the virtual item to these virtual objects, the player who receives the push message can quickly purchase the virtual item, thereby reducing a time to find the virtual item. Moreover, the virtual item is recommended by combining the user operation with the operation of recommending equipment, the need of the player to recommend a virtual item to their teammates by manual input is avoided, and the speed of recommending a virtual item to their teammates is increased.

In a preferred embodiment of the present disclosure, the method may further include the following steps:

- in response to a second operation on the target virtual item, configure the target virtual item to the first virtual character; and in response to a third operation on the target virtual item, determine the target virtual item as a preordered item.

The player may perform a second operation on the target virtual item to purchase the target virtual item, and the second operation may be an operation for purchasing a virtual item, for example, content in the graphical user interface includes a purchasing control, and the second operation is an operation acting on the purchasing control, such as a click operation or a double-click operation, etc. After receiving the second operation on the target virtual item, the game application may respond to the second operation by configuring the target virtual item to the first virtual character. Specifically, the attribute of the first virtual character may be configured according to the attribute corresponding to the target virtual item, for example, if the attribute corresponding to the target virtual item is sixty attack power, the attack power of the first virtual character may be configured to increase by sixty.

The player may also perform a third operation on the target virtual item to preorder the target virtual item, and the third operation may be an operation for preordering a virtual item, for example, content in the graphical user interface includes a preordering control, and the third operation is an operation acting on the preordering control, such as a click operation or a double-click operation, etc. After receiving the third operation on the target virtual item, the game application may respond to the third operation by determining the target virtual item as a preordered item. Specifically, displaying the target virtual item in a designated area (upper left corner) on the graphical user interface, thereby enabling the player to quickly click on the target virtual item to purchase.

In a preferred embodiment of the present disclosure, the graphical user interface provides a selection responding area, the selection responding area is separated from an area corresponding to the object identifiers, and the step 102 may include the following sub-step:

- in response to the selection operation acting on the selection responding area, determine the multiple object identifiers as the target object identifier.

The graphical user interface may include a selection responding area, the selection responding area is separated from an area corresponding to the object identifiers, for example, assuming that the area corresponding to the object identifiers is located in a lower half area of the graphical user interface and the selection responding area may be located in an upper half area of the graphical user interface. In the embodiments of the present disclosure, the selection responding area may be used for selecting all players belonging to the same camp as the player to recommend equipment to all the players.

Specifically, the player may perform a selection operation on the selection responding area of the graphical user interface, the selection operation may be at least one of the following: a click operation and a slide operation. After receiving the selection operation acting on the selection responding area, the selection operation may be responded to by determining the multiple object identifiers as a target object identifier, i.e., by determining all object identifiers displayed on the graphical user interface as the target object identifier.

In a preferred embodiment of the present disclosure, the step 101 may be at least one of the following:

- display, through the graphical user interface, at least one virtual item currently recommended; and display at least one virtual item through an equipment purchasing interface, herein the equipment purchasing interface is an interface displayed in response to a fifth operation acting on a store control of the graphical user interface.

In the embodiments of the present disclosure, at least one virtual item currently recommended may be displayed through the graphical user interface, herein, the at least one virtual item currently recommended may be at least one virtual item automatically recommended to the player by the current game application, and in some game scenes, the game application may automatically determine the virtual items to be recommended to the player based on the virtual object and display these virtual items in a designated area (e.g., upper left corner) of the graphical user interface to recommend these virtual items to the player.

In the embodiments of the present disclosure, at least one virtual item may also be displayed through an equipment purchasing interface. Specifically, content in the graphical user interface may include a store control, and the player may perform a fifth operation acting on the store control to open the equipment purchasing interface. The fifth operation may include a click operation, a double-click operation, and a long press operation, etc., without limitations in the embodiments of the present disclosure. The game application may, in response to the fifth acting on the store control of the graphical user interface, display an equipment purchasing interface, and content in the equipment purchasing interface may include at least one virtual item.

In a preferred embodiment of the present disclosure, the selection operation is a slide operation, and the step 103 may include the following sub-steps:

in response to the slide operation on the object identifiers, determine a moving track; and when the moving track passes through the multiple object identifiers, determine one or more object identifiers passed through by the moving track as the target object identifier.

In the embodiments of the present disclosure, the selection operation may be a slide operation, the player may select the target object identifier from the multiple object identifiers through the slide operation. Specifically, the slide operation may have a corresponding touch point, and the moving track may be determined according to each position of the touch point of the slide operation at different moments. After the moving track is determined, whether the moving track passes through the multiple object identifiers on the graphical user interface is judged, and when the moving track passes through the multiple object identifiers, determine one or more object identifiers passed through by the moving track as the target object identifier.

As an example, content in graphical user interface includes four object identifiers A, B, C, and D, and assuming that the object identifiers passed through by the moving track are object identifiers A and B, object identifiers A and B may be determined as the target object identifier.

It should be noted that when the moving track does not pass through the multiple object identifiers, then it can be considered that the player has not selected the virtual object to be recommended. At this time, the sending of the push message may be canceled, or a trigger condition may be set, and when the slide operation satisfies the trigger condition, the push message is sent to one or more second virtual objects specified and belonging to the same camp as the first virtual object, for example, all the second virtual objects may be specified, and the push message is sent to all the second virtual objects.

In the embodiments of the present disclosure, a starting point of the slide operation acts on the target virtual item.

Specifically, after the first operation, the operation medium may not leave the target virtual item in at least one virtual items, and the player continues to slide the operation medium to perform the slide operation and selects the target object identifier through the slide operation to further accelerate the player's recommendation of the virtual item.

In a preferred embodiment of the present disclosure, the selection operation is a slide operation, and the step 103 may include the following sub-steps:

in response to the slide operation acting on the graphical user interface, determine a moving track and a moving distance; and when the moving track does not pass through the multiple object identifiers, if the moving distance is greater than a preset distance threshold, determine the multiple object identifiers as the target object identifier.

Specifically, the slide operation may have a corresponding touch point, and the moving track and the moving distance may be determined based on each position of the touch point of the slide operation at different moments. After determining the moving track and the moving distance, whether the moving track passes through the multiple object identifiers on the graphical user interface is judged, and when the moving track does not pass through the multiple object identifiers, a step may further be performed to judge whether the moving distance is greater than a preset distance threshold, the preset distance threshold may be a predetermined distance threshold, for example, a predetermined distance threshold of 15 mm. If the moving distance is greater than the preset distance threshold, the moving distance is considered to satisfy the trigger condition, and the multiple object identifiers on the graphical user interface may be determined as the target object identifier so that a push message may be sent to all of the player's teammates. In addition, if the moving distance is less than or equal to the preset distance threshold, the moving distance is considered not to satisfy the trigger condition, and the player may be considered not to have selected the virtual object to be recommended, at this time, the sending of the push message may be cancelled.

As an example, content in graphical user interface includes four object identifiers A, B, C, and D, the preset distance threshold is 15 mm, and assuming that the moving distance is 20 mm, the moving distance is greater than the preset distance threshold, object identifiers A, B, C, and D may be determined as the target object identifier.

In a preferred embodiment of the present disclosure, the method may further include the following sub-step:

if one or more object identifiers determined as the target object identifier are passed through again by the moving track, cancel determination of the one or more object identifiers passed through again by the moving track as the target object identifier.

After determining the one or more object identifiers passed through by the moving track as the target object identifier, the slide operation is not yet finished and the player may continue to perform the slide operation to further select other object identifiers as the target object identifier, or may return to the determined target object identifier through the slide operation to cancel determination of the target object identifier.

Specifically, the game application may determine whether one or more object identifiers determined as the target object identifier are passed through again by the moving track, and if one or more object identifiers determined as the target object identifier are passed through again by the moving track, the game application may cancel determination of the one or more object identifiers passed through again by the moving track as the target object identifier.

As an example, content in graphical user interface includes four object identifiers A, B, C, and D, the object identifiers B, C, and D are determined as the target object identifier, at this time, if the object identifier B in the target object identifier is passed through again by the moving track, then the determination of object identifier B as the target object identifier may be canceled, i.e., the object identifiers C and D are determined as the target object identifier.

In a preferred embodiment of the present disclosure, the method may further include the following sub-step:

after determining the multiple object identifiers as the target object identifier, if the moving distance is less than or equal to the preset distance threshold, cancel determination of the multiple object identifiers as the target object identifier.

After determining the multiple object identifiers on the graphical user interface as the target object identifier, the player may continue to perform the slide operation and the game application may determine whether the moving distance is greater than the preset distance threshold, and if the moving distance is less than or equal to the preset distance threshold, then the determination of the multiple object identifiers as the target object identifier is canceled. Therefore, when the moving distance is less than or equal to the preset distance threshold, no target object identifier is selected. If the sending operation is detected at this time, no push message will be sent.

As an example, content in graphical user interface includes four object identifiers A, B, C, and D, the preset distance threshold is 15 mm, and assuming that the object identifiers A, B, C, and D are determined as the target object identifier, if the moving distance is changed to be 10 mm, then the determination of object identifiers A, B, C, and D as the target object identifier may be canceled.

In a preferred embodiment of the present disclosure, the step 102 may include the following sub-steps:

obtain location information of the target virtual item; determine a target area matching the location information; and display the multiple object identifiers in the target area of the graphical user interface.

The location information of the virtual item may be represented as coordinates of a central location of the virtual item, including a horizontal coordinate x and a vertical coordinate y. The target area refers to an area for displaying the object identifiers, which may be determined based on the location information of the target virtual item.

Specifically, it may be determined whether the target virtual item is located in an upper half area of the graphical user interface or in a lower half area of the graphical user interface based on the location information of the target virtual item. When the target virtual item is located in the upper half area of the graphical user interface, then the target area may be determined to be an area within a preset range upward based on a lower edge of the target virtual item. When the target virtual item is located in the lower half area of the graphical user interface, the target area may be determined to be an area within a preset range downward from an upper edge of the target virtual item. Herein, the preset range may be a preset range of an area, for example, the preset range may be a rectangular or arcuate area around the target virtual item.

In a specific implementation, the position information of the target virtual item may be obtained, which may be expressed as (x, y), with the bottommost end of the graphical user interface as a benchmark, whether the coordinate y of the target virtual item is greater than half of the overall height h0 of the graphical user interface is determined, and if the coordinate y is greater than half of h0, i.e., $y>h0/2$, the target virtual item is determined to be located in the upper half area of the graphical user interface, otherwise, the target virtual item is determined to be located in the lower half area of the graphical user interface.

Figure 2:
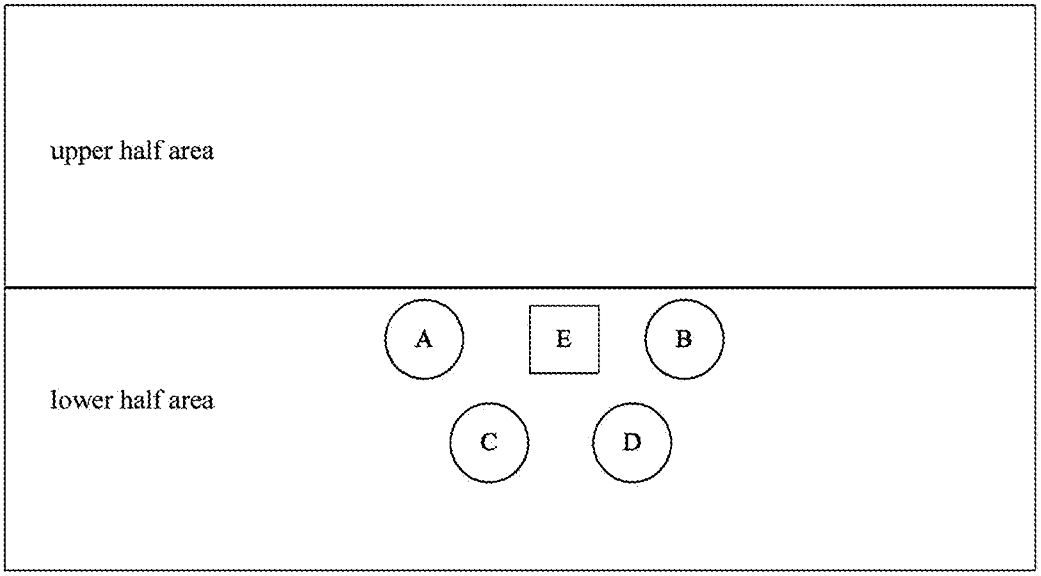
FIG. 2 is a schematic diagram providing multiple object identifiers of the present disclosure.

As an example, if four object identifiers A, B, C and D need to be displayed in the graphical user interface, and the target virtual item E is located in the lower half aera of the graphical user interface, the four object identifiers may be divided into two lines for displaying, of which the upper edge of the first line of two object identifiers A and B is aligned with the upper edge of the target virtual item E, the second line of two object identifiers C and D is displayed below the object identifiers A and B, and the four object identifiers A, B C and D are symmetrical about the target virtual item E, as shown in FIG. 2.

In a preferred embodiment of the present disclosure, the step 102 may include the following sub-step:

provide a preset mask on an upper layer of the graphical user interface, and display the multiple object identifiers on the preset mask.

In the embodiment, the preset mask may be a predetermined mask, which may be black and have transparency. When multiple object identifiers need to be displayed, a preset mask may be provided on the upper layer of the graphical user interface, and the multiple object identifiers may be displayed in the preset mask. It should be noted that after a preset mask is provided on the upper layer of the graphical user interface, the control in the graphical user interface may not continue to respond to the user's operation. For example, in the store page, the purchasing control for a virtual item may not respond to the user's operation to purchase the virtual item and to configure the virtual item to the first virtual character.

In a specific implementation, the target virtual item may also be displayed in the preset mask. The target virtual item is set to be in a highlighted state. The multiple object identifiers are displayed around the target virtual item. The multiple object identifiers may be in a non-highlighted state when initially displayed and only displayed in a highlighted state after being selected, making it easy for the player to confirm which object identifiers are selected.

In a preferred embodiment of the present disclosure, the method may further include the following step:

after the target object identifier is determined from the multiple object identifiers, set the target object identifier on the preset mask to a highlighted state.

Specifically, the object identifier may have corresponding state attribute. After determining the target object identifier from the multiple object identifiers, the target object identifier in the preset mask may be set to the highlighted state by modifying the state attribute. As shown in FIG. 2, the object identifiers B and D in the preset mask may be set to the highlighted state.

Figure 3:
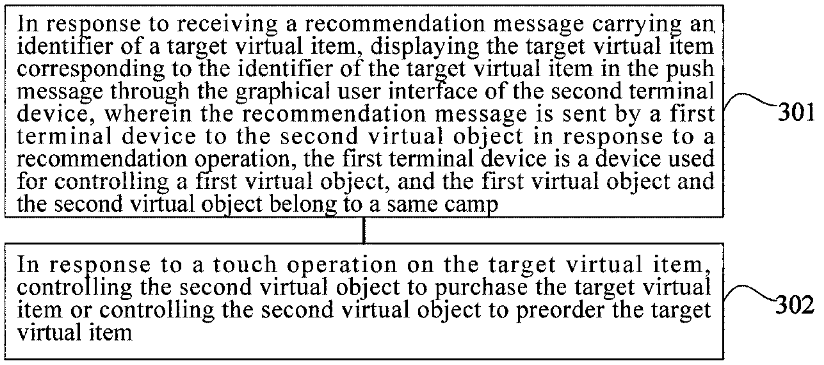
FIG. 3 is a flowchart of steps of a method for purchasing a virtual item of a game of an embodiment of the present disclosure.

Referring to FIG. 3, a flowchart of steps of a method for purchasing a virtual item of a game of an embodiment of the present disclosure is shown, herein, a second terminal device provides a graphical user interface, and the second terminal device is configured to control a second virtual object, and the method may include the following steps 301 to 302.

In the step 301, when receiving a push message carrying an identifier of a target virtual item, the target virtual item corresponding to the identifier of the target virtual item in the push message is displayed through the graphical user interface of the second terminal device, herein the push message is sent by a first terminal device to the second virtual object in response to a recommendation operation, the first terminal device is a device used for controlling a first virtual object, and the first virtual object and the second virtual object belong to a same camp.

In the embodiments of the present disclosure, the push message may be a message configured to recommend a virtual item to the players, and the push message carries the identifier of the target virtual item. The push message is sent by the first terminal device to the second virtual object in response to the recommendation operation. In this embodiment, the first terminal device is a device used for controlling a first virtual object, and the first virtual object and the second virtual object belong to a same camp. The recommendation operation may be an operation configured to recommend a virtual item, including a first operation, a selection operation and a sending operation. The player may select the target virtual item by performing the first operation on the first terminal device, select the target object identifier from multiple object identifiers by performing the selection operation, and send the push message carrying an identifier of the target virtual item to the second virtual object corresponding to the target object identifier by performing the sending operation, the specific process of which is described above in the steps 101 to 104, and will not be repeated here.

When receiving the push message carrying the identifier of the target virtual item, the displaying of the target virtual item corresponding to the identifier of the target virtual item in the push message through the graphical user interface of the second terminal device is triggered, so that the player can quickly purchase the target virtual item. In addition, a reminder message containing the target virtual object may also be displayed on the graphical user interface to remind the player of the virtual item required to be purchased and to independently select whether to purchase the target virtual object.

In the step 302, in response to a touch operation on the target virtual item, the second virtual object is controlled to purchase the target virtual item or the second virtual object is controlled to preorder the target virtual item.

The player may perform the touch operation on the target virtual item to purchase the target virtual item or preorder the target virtual item. The touch operation may be a click operation, a long press operation or a re-press operation, etc., which is not limited by the embodiments of the present disclosure. After receiving the touch operation on the target virtual item, the game application may respond to the touch operation, control the second virtual object to purchase the target virtual item or control the second virtual object to preorder the target virtual item. Specifically, if the virtual currency of the second virtual object satisfies the conditions for purchasing the target virtual item, the target virtual item may be directly purchased and configured to the second virtual object. If the virtual currency of the second virtual object does not satisfy the conditions for purchasing the target virtual item, the target virtual item may be directly preordered to facilitate quick purchase of the target virtual item when the purchase is needed.

Figure 4:
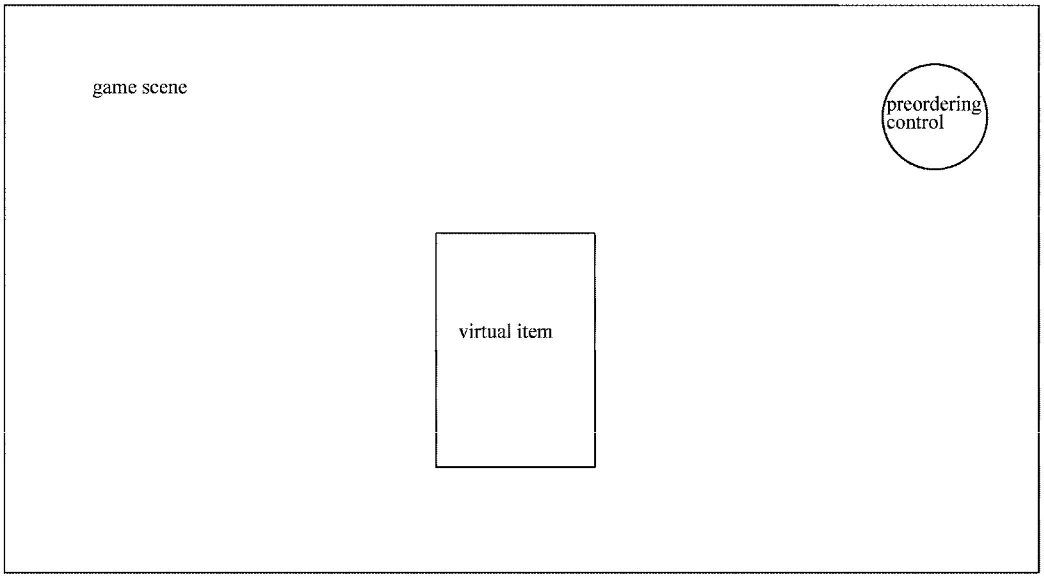
FIG. 4 is a schematic diagram providing a preordering control of the present disclosure.

As an example, content in the graphical user interface may include a preordering control, the preordering control may be a control used for preordering a virtual item. The player may preorder the target virtual item by interacting with the preordering control. In a specific implementation, the preordering control may be displayed in a specified position of the graphical user interface, for example, the preordering control may be displayed in the upper right corner of the graphical user interface, as shown in FIG. 4. In the embodiments of the present disclosure, when receiving a push message carrying an identifier of a target virtual item, the target virtual item corresponding to the identifier of the target virtual item in the push message is displayed through the graphical user interface of the second terminal device, and in response to a touch operation on the target virtual item, the second virtual object is controlled to purchase the target virtual item or the second virtual object is controlled to preorder the target virtual item. Therefore, after receiving the push message carrying the identifier of the target virtual item, the player does not need to open the equipment purchasing interface or find the target virtual item in the equipment purchasing interface before purchasing, so as to speed up the player's purchase of the virtual item recommended by other players.

Figure 5:
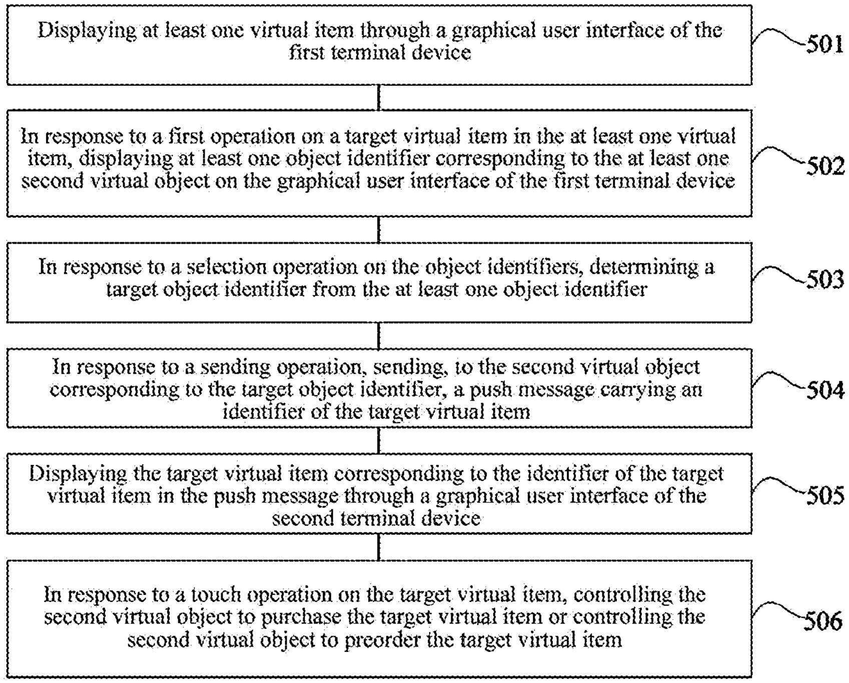
FIG. 5 is a flowchart of steps of a method for recommending a virtual item of a game of another embodiment of the present disclosure.

Referring to FIG. 5, a flowchart of steps of a method for recommending a virtual item of a game of an embodiment of the present disclosure is shown, the game includes a first virtual object controlled by a first terminal device and at least one second virtual object controlled by at least one second terminal device, wherein the first virtual object and the second virtual object belong to a same camp, and the method includes the following steps 501 to 506.

In the step 501, at least one virtual item is displayed through a graphical user interface of the first terminal device.

In the step 502, in response to a first operation on a target virtual item in the at least one virtual item, at least one object identifier corresponding to the at least one second virtual object is displayed on the graphical user interface of the first terminal device.

In the step 503, in response to a selection operation on the object identifiers, a target object identifier is determined from the at least one object identifier.

In the step 504, in response to a sending operation, a push message carrying an identifier of the target virtual item is sent to the second virtual object corresponding to the target object identifier.

In the step 505, the target virtual item corresponding to the identifier of the target virtual item in the push message is displayed through a graphical user interface of the second terminal device.

In the step 506, in response to a touch operation on the target virtual item, the second virtual object is controlled to purchase the target virtual item or is controlled to preorder the target virtual item.

In an embodiment of the present disclosure, at least one virtual item is displayed through a graphical user interface of the first terminal device, in response to a first operation on a target virtual item in the at least one virtual item, at least one object identifier corresponding to the at least one second virtual object is displayed on the graphical user interface of the first terminal device, in response to a selection operation on the object identifiers, a target object identifier is determined from the at least one object identifier, in response to a sending operation, a push message carrying an identifier of the target virtual item is sent to the second virtual object corresponding to the target object identifier, the target virtual item corresponding to the identifier of the target virtual item in the push message is displayed through a graphical user interface of the second terminal device, in response to a touch operation on the target virtual item, the second virtual object is controlled to purchase the target virtual item or is controlled to preorder the target virtual item. The steps 501 to 504 in the embodiment of the present disclosure are similar to the steps 101 to 104 above, and the steps 505 to 506 are similar to the steps 301 to 302 above, and will not be repeated herein.

In the embodiments of the present disclosure, the player recommending a virtual item may trigger the quick selection of a virtual item that needs to be recommended through the first operation, flexibly select the virtual objects that need to be recommended through the selection operation, and send the push message for the virtual item to these virtual objects, so that the player who receives the push message can quickly purchase the virtual item, thereby reducing a time to find the virtual item. Moreover, the virtual item is recommended by combining the user operation with the operation of recommending equipment, the need of the player to recommend a virtual item to their teammates by manual input is avoided, and the speed of recommending a virtual item to their teammates is increased. After receiving the push message carrying the identifier of the target virtual item, the player does not need to open the equipment purchasing interface or find the target virtual item in the equipment purchasing interface before purchasing, so as to speed up the player's purchase of the virtual item recommended by other players.

It should be noted that for the sake of simple description, the method embodiments are all expressed as a series of action combinations. However, those skilled in the art should know that the disclosed embodiments are not limited by the described action sequence, because according to the disclosed embodiments, certain steps may be performed in other sequences or at the same time. Secondly, those skilled in the art should also know that the embodiments described in the specification are all preferred embodiments, and the actions involved are not necessarily necessary for the embodiments of the present disclosure.

Figure 6:
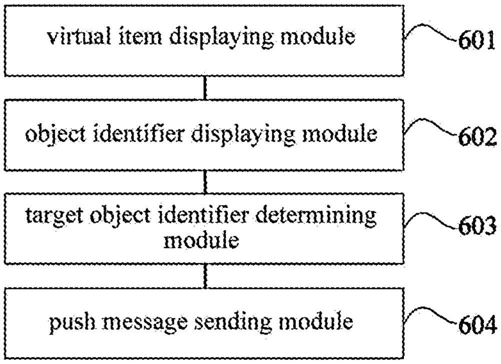
FIG. 6 is a structural block diagram of an apparatus for recommending a virtual item of a game of an embodiment of the present disclosure.

Referring to FIG. 6, a structural block diagram of an apparatus for recommending a virtual item of a game of an embodiment of the present disclosure is shown. In this embodiment, a graphical user interface is provided through a first terminal device, the first terminal device is configured to control a first virtual object, and the apparatus includes the following modules:

a virtual item displaying module 601, configured to display at least one virtual item through the graphical user interface.

an object identifier displaying module 602, configured to in response to a first operation on a target virtual item in the at least one virtual item, display multiple object identifiers on the graphical user interface, herein second virtual objects corresponding to the object identifiers and the first virtual object belong to a same camp.

a target object identifier determining module 603, configured to in response to a selection operation on the object identifiers, determine a target object identifier from the multiple object identifiers.

a push message sending module 604, configured to in response to a sending operation, send, to the second virtual object corresponding to the target object identifier, a push message carrying an identifier of the target virtual item, causing a second terminal device, used for controlling the second virtual object corresponding to the target object identifier, to display the target virtual item on a graphical user interface of the second terminal device.

In a preferred embodiment of the present disclosure, the apparatus further includes the following modules:

a virtual item configuring module, configured to in response to a second operation on the target virtual item, configure the target virtual item to the first virtual character.

a virtual item preordering module, configured to in response to a third operation on the target virtual item, determine the target virtual item as a preordered item.

In a preferred embodiment of the present disclosure, the graphical user interface provides a selection responding area, the selection responding area is separated from an area corresponding to the object identifiers, and the target object identifier determining module 603 includes the following module:

a first determining sub-module, configured to in response to the selection operation acting on the selection responding area, determine the multiple object identifiers as the target object identifier.

In a preferred embodiment of the present disclosure, the selection operation is at least one operation of a click operation and a slide operation.

In a preferred embodiment of the present disclosure, the virtual item displaying module 601 includes the following modules:

a first displaying sub-module, configured to display, through the graphical user interface, at least one virtual item currently recommended.

a second displaying sub-module, configured to display at least one virtual item through an equipment purchasing interface, herein the equipment purchasing interface is an interface displayed in response to a fifth operation acting on a store control of the graphical user interface.

In a preferred embodiment of the present disclosure, the selection operation is a slide operation, and the target object identifier determining module 603 includes the following modules:

a moving track determining sub-module, configured to in response to the slide operation on the object identifiers, determine a moving track.

a second determining sub-module, configured to when the moving track passes through the multiple object identifiers, determine one or more object identifiers passed through by the moving track as the target object identifier.

In a preferred embodiment of the present disclosure, a starting point of the slide operation acts on the target virtual item.

In a preferred embodiment of the present disclosure, the selection operation is a slide operation, and the target object identifier determining module 603 includes the following modules:

a moving distance determining sub-module, configured to in response to the slide operation acting on the graphical user interface, determine a moving track and a moving distance.

a third determining sub-module, configured to when the moving track does not pass through the multiple object identifiers, if the moving distance is greater than a preset distance threshold, determine the multiple object identifiers as the target object identifier.

In a preferred embodiment of the present disclosure, the target object identifier determining module 603 further includes the following module:

a first cancelling sub-module, configured to if one or more object identifiers determined as the target object identifier are passed through again by the moving track, cancel determination of the one or more object identifiers passed through again by the moving track as the target object identifier.

In a preferred embodiment of the present disclosure, the target object identifier determining module 603 further includes the following module:

a second cancelling sub-module, configured to after determining the multiple object identifiers as the target object identifier, if the moving distance is less than or equal to the preset distance threshold, cancel determination of the multiple object identifiers as the target object identifier.

In a preferred embodiment of the present disclosure, the object identifier displaying module 602 includes the following modules:

a location obtaining module, configured to obtain location information of the target virtual item.

a target area determining module, configured to determine a target area matching the location information.

a first displaying sub-module, configured to display the multiple object identifiers in the target area of the graphical user interface.

In a preferred embodiment of the present disclosure, the object identifier displaying module 602 includes the following module:

a second displaying sub-module, configured to provide a preset mask on an upper layer of the graphical user interface, and display the multiple object identifiers on the preset mask.

In a preferred embodiment of the present disclosure, the object identifier displaying module 602 further includes the following module:

an object identifier setting sub-module, configured to after the target object identifier is determined from the multiple object identifiers, set the target object identifier on the preset mask to a highlighted state.

Figure 7:
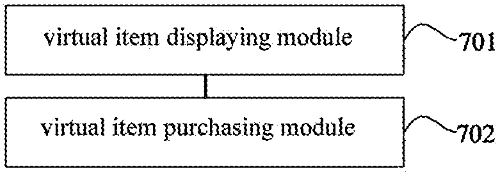
FIG. 7 is a structural block diagram of an apparatus for purchasing a virtual item of a game of an embodiment of the present disclosure.

Referring to FIG. 7, a structural block diagram of an apparatus for purchasing a virtual item of a game of an embodiment of the present disclosure is shown. In this embodiment, a graphical user interface is provided through a second terminal device, the second terminal device is configured to control a second virtual object, and the apparatus specifically includes the following modules:

a virtual item displaying module 701, configured to when receiving a push message carrying an identifier of a target virtual item, display the target virtual item corresponding to the identifier of the target virtual item in the push message through the graphical user interface of the second terminal device, herein the push message is sent by a first terminal device to the second virtual object in response to a user operation, the first terminal device is a device used for controlling a first virtual object, and the first virtual object and the second virtual object belong to a same camp.

a virtual item purchasing module 702, configured to in response to a touch operation on the target virtual item, control the second virtual object to purchase the target virtual item or control the second virtual object to preorder the target virtual item.

Figure 8:
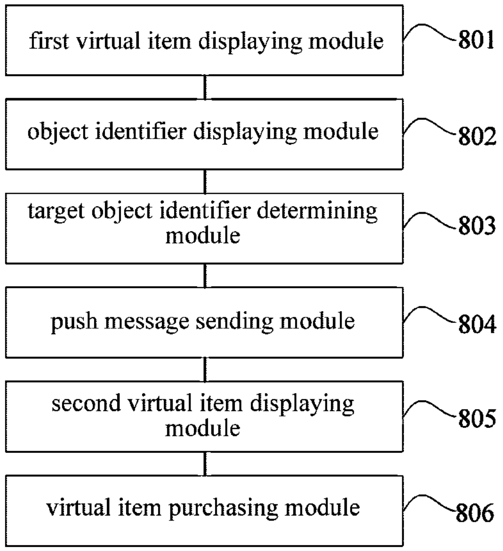
FIG. 8 is a structural block diagram of an apparatus for recommending a virtual item of a game of an embodiment of the present disclosure.

Referring to FIG. 8, a structural block diagram of an apparatus for recommending a virtual item of a game of an embodiment of the present disclosure is shown. In this embodiment, the game includes a first virtual object controlled by a first terminal device and at least one second virtual object controlled by at least one second terminal device, herein the first virtual object and the second virtual object belong to a same camp, and the apparatus includes the following modules:

a first virtual item displaying module 801, configured to display at least one virtual item through a graphical user interface of the first terminal device.

an object identifier displaying module 802, configured to in response to a first operation on a target virtual item in the at least one virtual item, display at least one object identifier corresponding to the at least one second virtual object on the graphical user interface of the first terminal device.

a target object identifier determining module 803, configured to in response to a selection operation on the object identifiers, determine a target object identifier from the at least one object identifier.

a push message sending module 804, configured to in response to a sending operation, send, to the second virtual object corresponding to the target object identifier, a push message carrying an identifier of the target virtual item.

a second virtual item displaying module 805, configured to display the target virtual item corresponding to the identifier of the target virtual item in the push message through a graphical user interface of the second terminal device.

a virtual item purchasing module 806, configured to in response to a touch operation on the target virtual item, control the second virtual object to purchase the target virtual item or control the second virtual object to preorder the target virtual item.

For the apparatus embodiments, since it is substantially similar to the above method embodiments, the description is relatively simple, and relevant parts may be referred to the description of the method embodiments.

Figure 9:
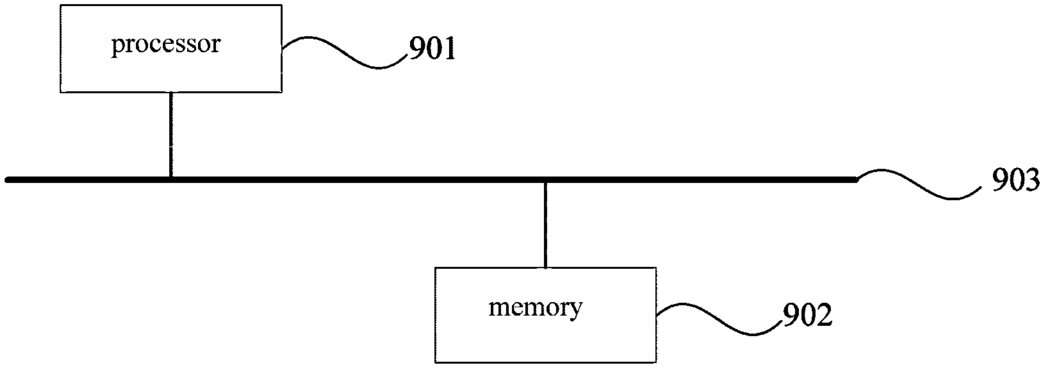
FIG. 9 is a structural block diagram of an electronic device of the present disclosure.

One embodiment of the present disclosure discloses an electronic device, as shown in FIG. 9, the electronic device includes:

a processor 901, a memory 902 and a bus 903, the memory 902 storing machine-readable instructions executable by the processor 901; and when the electronic device is running, the processor 901 communicates with the memory 902 through the bus 903, the machine-readable instructions are executed by the processor 901 to implement the method according to any one of embodiments of the present disclosure. The specific implementation and technical effects are similar and will not be repeated here.

Figure 10:
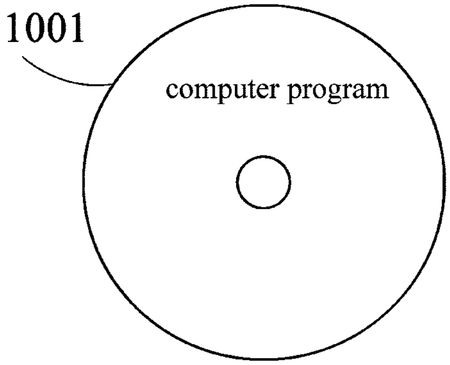
FIG. 10 is a structural block diagram of a storage medium of the present disclosure.

As shown in FIG. 10, one embodiment of the present disclosure discloses a storage medium storing a computer program 1001. In this embodiment, the computer program 1001, when executed by a processor in working, implements the method according to any one of embodiments of the present disclosure.

The various embodiments in the present specification are described in a progressive manner, and description of each embodiment focuses on differences from other embodiments, and the same or the similar parts between the various embodiments can be referred to each other.

One ordinary skill in the art will appreciate that embodiments of the disclosed embodiments can be provided as a method, apparatus, or computer program product. Thus, embodiments of the present disclosure can take the form of an entirely hardware embodiment, an entirely software embodiment, or a combination of software and hardware. Moreover, embodiments of the present disclosure can take the form of a computer program product embodied on one or more computer usable storage medium (including and not limited to disk storage, CD-ROM, optical storage, etc.) including computer usable program code.

Embodiments of the present disclosure are described with reference to flowchart and/or block diagrams of methods, terminal devices (systems), and computer program products according to embodiments of the present disclosure. It should be understood that each process and/or block of the flowchart or the block diagrams, and a combination of process and/or block of the flowchart or the block diagrams by computer program instructions can be implemented. The computer instructions can be provided to a general purpose computer, special purpose computer, embedded processor or other programmable data processing terminal device to produce a machine such that instructions executed by a processor of a computer or other programmable data processing terminal device are configured to produce a device for implementing the functions specified in one or more of the processes in the flowchart or in one or more blocks of the diagram blocks.

The computer program instructions can further be stored in a computer readable memory that can direct a computer or other programmable data processing terminal device to operate in a particular manner, such that the instructions stored in the computer readable memory produce a product including the instruction device. The instruction device implements the functions specified in one or more of the processes in the flowchart or in one or more blocks of the diagram blocks.

These computer program instructions can further be loaded onto a computer or other programmable data processing terminal device such that a series of operational steps are performed on the computer or other programmable terminal device to produce computer-implemented processing, such that the instructions executed on the computer or other programmable terminal device provide steps for implementing the functions specified in one or more of the processes in the flowchart or in one or more blocks of the diagram blocks.

While the preferred embodiment of the present invention has been described, it will be apparent that one of ordinary skill in the art can make further changes and modifications to the embodiments upon learning the essential inventive concept of the present disclosure. Therefore, the appended claims are intended to be interpreted as including the preferred embodiments and the modifications and variations falling into the scope of the embodiments.

Finally, it should also be noted that in this context, relational terms such as first and second are used merely to distinguish one entity or operation from another entity or operation, and do not necessarily require or imply that there is relation or sequence between these entities or operations. Furthermore, the terms "include" or "including" or "containing" or any other variations that are intended to encompass a non-exclusive inclusion, such that a process, method, article, or terminal device that includes a plurality of elements includes not only those elements but also other elements that are named specifically, or include elements inherent to such a process, method, article, or terminal device. An element defined by the phrase "including a . . . " does not exclude the presence of additional identical elements in the process, method, article, or terminal device that includes the element, without further limitation.

The method for recommending and purchasing virtual item of game as provided in the present disclosure are described in detail above, and the principles and the embodiments of the present disclosure are depicted through specific examples. However, the description of the embodiments is merely provided for understanding the gist of the methods and the apparatuses of the present disclosure. And based on the gist of the present disclosure, modifications in the specific embodiments and in the applications of the present disclosure can easily occur to one of ordinary skill in the art. And in general, the contents contained in die description cannot be construed as a limit to the present disclosure.

The invention claimed is:

1. A method for recommending a virtual item of a game, wherein a graphical user interface is provided through a first terminal device, the first terminal device is configured to control a first virtual object, and the method comprises:

displaying at least one virtual item through the graphical user interface;

in response to a first operation on a target virtual item in the at least one virtual item, displaying multiple object identifiers on the graphical user interface, wherein second virtual objects corresponding to the object identifiers and the first virtual object belong to a same camp;

in response to a selection operation on the object identifiers, determining a target object identifier from the multiple object identifiers; and in response to a sending operation, sending, to the second virtual object corresponding to the target object identifier, a push message carrying an identifier of the target virtual item, causing a second terminal device, used for controlling the second virtual object corresponding to the target object identifier, to display the target virtual item on a graphical user interface of the second terminal device; wherein the selection operation is a slide operation, and the determining the target object identifier from the multiple object identifiers comprises:

in response to the slide operation on the object identifiers, determining a moving track; and in response to the moving track passing through the multiple object identifiers, determining one or more object identifiers passed through by the moving track as the target object identifier.

2. The method according to claim 1, further comprising at least one of the following:

in response to a second operation on the target virtual item, configuring the target virtual item to the first virtual object; and in response to a third operation on the target virtual item, determining the target virtual item as a preordered item.

3. The method according to claim 1, wherein the graphical user interface provides a selection responding area, the selection responding area is separated from an area corresponding to the object identifiers, and the determining the target object identifier from the multiple object identifiers comprises:

in response to the selection operation on the selection responding area, determining the multiple object identifiers as the target object identifier.

4. The method according to claim 2, wherein the selection operation is at least one operation of a click operation and a slide operation.

5. The method according to claim 1, wherein the displaying at least one virtual item through the graphical user interface is at least one step of:

displaying, through the graphical user interface, at least one virtual item currently recommended; and displaying at least one virtual item through an equipment purchasing interface, wherein the equipment purchasing interface is an interface displayed in response to a fifth operation on a store control of the graphical user interface.

6. The method according to claim 1, wherein a starting point of the slide operation acts on the target virtual item.

7. The method according to claim 1, further comprising:

in response to one or more object identifiers determined as the target object identifier being passed through again by the moving track, cancelling determination of the one or more object identifiers passed through again by the moving track as the target object identifier.

8. The method according to claim 1, wherein the displaying the multiple object identifiers on the graphical user interface comprises:

obtaining location information of the target virtual item;

determining a target area matching the location information;

displaying the multiple object identifiers in the target area of the graphical user interface.

9. The method according to claim 1, wherein the displaying the multiple object identifiers on the graphical user interface comprises:

providing a preset mask on an upper layer of the graphical user interface, and displaying the multiple object identifiers on the preset mask.

10. The method according to claim 9, further comprising:

after the target object identifier is determined from the multiple object identifiers, setting the target object identifier on the preset mask to a highlighted state.

11. An electronic device, applied to a first terminal device, wherein a graphical user interface is provided through the first terminal device, the first terminal device is configured to control a first virtual object, and the electronic device comprises:

a processor, a memory and a bus, the memory storing machine-readable instructions executable by the processor; and when the electronic device is running, the processor communicates with the memory through the bus, the machine-readable instructions are executed by the processor, wherein the processor, through executing the machine-readable instructions, is configured to:

display at least one virtual item through the graphical user interface;

in response to a first operation on a target virtual item in the at least one virtual item, display multiple object identifiers on the graphical user interface, wherein second virtual objects corresponding to the object identifiers and the first virtual object belong to a same camp;

in response to a selection operation on the object identifiers, determine a target object identifier from the multiple object identifiers; and in response to a sending operation, send, to the second virtual object corresponding to the target object identifier, a push message carrying an identifier of the target virtual item, causing a second terminal device, used for controlling the second virtual object corresponding to the target object identifier, to display the target virtual item on a graphical user interface of the second terminal device; wherein the selection operation is a slide operation, and the processor is specifically configured to:

in response to the slide operation on the object identifiers, determine a moving track; and in response to the moving track passing through the multiple object identifiers, determine one or more object identifiers passed through by the moving track as the target object identifier.

12. The method according to claim 10, wherein the setting the target object identifier on the preset mask to the highlighted state comprises:

modifying state attribute of the target object identifier to set the target object identifier on the preset mask to the highlighted state.

13. The method according to claim 8, wherein the location information of the target virtual item is coordinates of a central location of the target virtual item, and the target area is an area for displaying the object identifiers.

14. The method according to claim 5, wherein the fifth operation is at least one operation of a click operation, a double-click operation and a long press operation.

15. A method for recommending a virtual item of a game, wherein a graphical user interface is provided through a first terminal device, the first terminal device is configured to control a first virtual object, and the method comprises:

displaying at least one virtual item through the graphical user interface;

in response to a first operation on a target virtual item in the at least one virtual item, displaying multiple object identifiers on the graphical user interface, wherein second virtual objects corresponding to the object identifiers and the first virtual object belong to a same camp;

in response to a selection operation on the object identifiers, determining a target object identifier from the multiple object identifiers; and in response to a sending operation, sending, to the second virtual object corresponding to the target object identifier, a push message carrying an identifier of the target virtual item, causing a second terminal device, used for controlling the second virtual object corresponding to the target object identifier, to display the target virtual item on a graphical user interface of the second terminal device; wherein the selection operation is a slide operation, and the determining the target object identifier from the multiple object identifiers comprises:

in response to the slide operation on the graphical user interface, determining a moving track and a moving distance; and in response to the moving track not passing through the multiple object identifiers, in case the moving distance is greater than a preset distance threshold, determining the multiple object identifiers as the target object identifier.

16. The method according to claim 15, further comprising:

after determining the multiple object identifiers as the target object identifier, in response to the moving distance being less than or equal to the preset distance threshold, cancelling determination of the multiple object identifiers as the target object identifier.

* * * * *